Sept. 1, 1964  F. C. OWEN  3,147,455
CONTROLLED SATURATION WELDING TRANSFORMER
Filed Dec. 23, 1963

INVENTOR.
FREDERICK C. OWEN
BY
ATTORNEY

United States Patent Office 3,147,455
Patented Sept. 1, 1964

3,147,455
CONTROLLED SATURATION WELDING
TRANSFORMER
Frederick C. Owen, 206 Fenton Place, Charlotte, N.C.
Filed Dec. 23, 1963, Ser. No. 332,549
10 Claims. (Cl. 336—133)

This invention relates broadly to welding transformers and more particularly to a welding transformer having core saturation control means at opposite ends thereof for selective control of the output welding current.

One of the objects of the invention is to provide a construction of welding transformer which provides the operator with simple means for easily adjusting and controlling the output welding current.

Another object of the invention is to provide a construction of welding transformer in which D.C. saturation fluxes at opposite ends of the transformer core are used for selectively varying the output A.C. welding current.

A further object of the invention is to provide a construction of saturable core welding transformer in which the saturation of opposite ends of the core are independently variable to provide a relatively wide range of adjustment of the output welding current.

Still another object of the invention is to provide an A.C. welding transformer in which the D.C. saturation of opposite ends of the core is variable by electrical and/or mechanical means to provide the operator with greater ease of control of selected A.C. output currents.

Other and further objects of the invention reside in the end core structure and the placement of the coils on the core intermediate the saturation control means as set forth more fully in the specification hereinafter following by reference to the accompanying drawings, in which.

Figure 1:
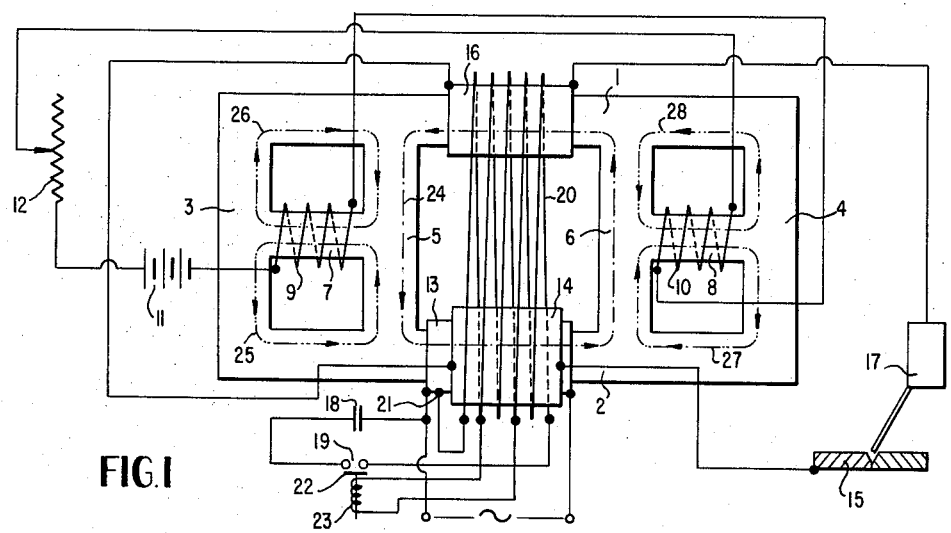
FIG. 1 is an electrical schematic diagram of a welding transformer according to the invention in which the core saturation is controlled by electrical means.

Referring to the drawings in greater detail, and particularly to the form of the invention shown in FIG. 1, the magnetic core of the transformer disclosed therein comprises a top transverse leg portion 1 and a bottom transverse leg portion 2 joined at opposite ends by side or end leg portions 3 and 4 respectively, and also joined intermediate the side or end leg portions by a pair of longitudinal or intermediate leg portions or core leg sections 5 and 6, which extend generally parallel with side leg portions 3 and 4, but in spaced relation thereto. Lateral leg portions or shunt core sections 7 and 8, extending generally parallel to top and bottom transverse leg portions 1 and 2, respectively, bridge side or end leg portion 3 and longitudinal core leg portion or section 5, and side or end leg portion 4 and longitudinal core leg portion or section 6, at positions generally midway between the top and bottom leg portions. Individual inductance windings or core saturation control windings 9 and 10, connected in electrical series circuit with each other and a source of D.C. power, such as battery 11, and an adjustable rheostat 12 are respectively wound about lateral leg portions or shunt core sections 7 and 8 to establish D.C. flux fields in the end portions of the core as explained more fully further in the specification.

The transformer windings, comprising the electrical welding circuit, are wound on the transformer core between intermediate leg portions 5 and 6. Primary winding 13 is wound on one of the outer transformer legs such as bottom leg portion 2, on the portion of that leg which lies between intermediate leg portions 5 and 6, with main secondary winding 14 wound concentrically therewith about bottom or lower leg portion 2 either above or below primary winding 13. One end of main secondary winding 14 is connected to the work 15 to be welded, and the opposite end of the winding is connected to auxiliary secondary winding 16 wound on the opposite outer core leg, such as top or upper leg portion 1 between intermediate leg portions 5 and 6. Main secondary winding 14 and auxiliary secondary winding 16 are connected in series aiding to form the secondary output welding circuit, with the opposite end of auxiliary secondary winding 16 being connected to the welding electrode indicated generally at 17.

Primary winding 13 is connected across a suitable source of A.C. power, in the usual manner, with one end thereof also connected through a bank of capacitors indicated generally at 18 and the open contacts 19 of a solenoid switch, to one end of a capacitor charging winding 20 wound about the perimeter of the top and bottom leg portions, between intermediate leg portions 5 and 6 on top of auxiliary winding 16 and the concentrically wound primary and main secondary windings 13 and 14, so as to be disposed in inductive relation with each of these windings. The opposite end of capacitor charging winding 20 is connected to primary winding 13, at 21, a coil or two removed from the same end to which capacitors 18 are connected. Solenoid coil 23 is connected across a few turns of capacitor charging winding 20 as shown and when energized is adapted to move movable contactor 22 to close the normally open solenoid contacts 19 to complete the charging circuit for the bank of capacitors, indicated at 18. The circuit is arranged such that when primary winding 13 is energized insufficient current is developed in capacitor charging winding 20 to close the solenoid switch. However, it will noted that the capacitor charging winding 20 is also inductively coupled with the windings 14 and 16 of the secondary circuit so that the instant the secondary circuit is closed by striking the arc between the work 15 and welding electrode 17, the A.C. flux fields generated in the core by these secondary windings induces a current in capacitor winding 20 which cuts these fields, and this current is of such magnitude to energize solenoid coil 23 to move contactor 22 which completes the normally open contacts 19, thus closing the charging circuit for the bank of capacitors which includes a few end coils of primary winding 13 and the capacitor charging winding 20. Thus the instant the arc is struck the charging circuit of the condenser bank is closed and the capacitors become fully charged. The charge on the capacitors in turn generates an A.C. flux in the transformer core in aiding relation with the flux generated by the primary winding to thus increase the current in the secondary windings which cut these flux fields to provide a greater output welding current at the welding electrode 17 than would normally be available. With the bank of capacitors 18 connected to the primary winding, in the manner described, when the capacitors become charged they tend to decrease the ampere draw from the line which energizes the primary winding and this has the effect of stabilizing the secondary voltage to eliminate variations in the welding arc due to secondary voltage variations. Additionally, this arrangement has been found to improve the power factor of the machine appreciably. Capacitor charging winding 20 may be connected in either aiding relation with, or in opposition to, the primary winding, with the latter arrangement being used when it is desired to reduce the voltage generated in the perimeter winding by the few volts generated in the few primary turns. This would aid in establishing the maximum output current that can be delivered by the machine.

When primary winding 13 is energized by the A.C. source it establishes an A.C. flux path or flux field, indicated at 24, in the core inductively coupling the primary winding to the secondary winding circuit. In addition A.C. leakage flux paths (not shown) are also established in the core extending in the same direction as flux path 24 but around the outer legs of the core, namely, bottom leg portion 2, side leg portion 4, top leg portion 1, and through side leg portion 3, back to bottom leg portion 2. As well known in transformer practice, as the flux coupling between the primary winding and the secondary circuit is decreased, the secondary output current is also decreased.

When the inductance or core saturation control windings 9 and 10 are energized by battery 11 they respectively establish the D.C. flux paths 25, 26, 27 and 28 in the end extremities of the transformer core, namely, in the core sections comprised by the end of bottom leg portion 2, the corresponding end of top leg portion 1, intermediate leg portion 5, side leg portion 2 and lateral leg portion 7; and the opposite ends of top and bottom leg portions 1 and 2, intermediate leg portion 6, side leg portion 4, and lateral leg portion 8. As the resistance of rheostat 12 is varied from a maximum to a minimum value the D.C. current flow through core saturation control windings 9 and 10 is varied from a minimum to a maximum and this increases the magnitude of the D.C. fluxes 25–28 to increase the degree of saturation of the end extremities of the transformer core. As the degree of saturation of the core is increased the effective reluctance of the side leg portions 3 and 4, intermediate leg portions 5 and 6, lateral leg portions 7 and 8, and the end extremities of the top and bottom leg portions 1 and 2 is increased, thus reducing the effective flux coupling between the primary winding 13 and the windings of the secondary circuit, since the increased reluctance of the core tends to decrease the magnitude of the A.C. flux path 24 and the magnitude of the other A.C. flux path, not shown, through the outer legs of the core. This raises the impedance of the transformer and decreases the output current in the secondary circuit available at the welding electrode for welding purposes. In effect, this manipulation of the rheostat decreases the efficiency of the transformer and makes it a poor transformer by decreasing the voltage induced in the main secondary winding and auxiliary secondary winding by the primary winding 13 and the capacitor charging winding 20, but it appears to have greater effect upon the voltage induced by these various windings in the auxiliary secondary winding 16. Thus the maximum output current of the machine is designed into the machine by the size of the various windings and by manipulation of the rheostat to increase the current in the saturation control windings 9 and 10, the secondary output current is varied from the maximum down to the minimum with the range of variation depending upon the number of turns in the variable coils, the magnitude of the rheostat 12, the voltage of the D.C. source 11, etc. The welder can thus vary the welding current by merely turning a rheostat dial, or the like, to provide him with simple control means during the welding operation.

To have efficient and effective positive control of the output welding current it has been found necessary to provide means at opposite ends of the core for varying the reluctance of opposite ends of the core so that the magnetic coupling between the transformer windings is uniformly increased or decreased, as the case may be.

Figure 2:
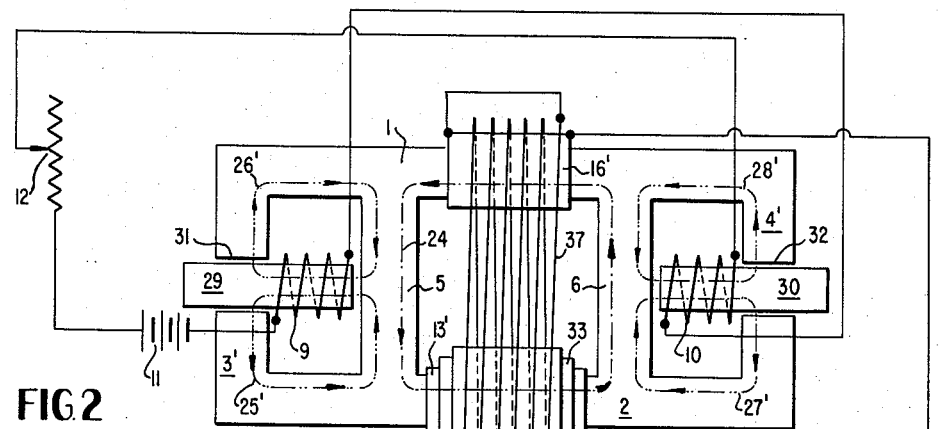
FIG. 2 is an electrical schematic diagram of a modified form of the transformer of FIG. 1 in which the core saturation is variable by both electrical and mechanical means.

A modified form of the transformer of the invention is shown in FIG. 2 where, in lieu of stationary shunt core sections or lateral leg portions 7 and 8, laterally movable shunt members 29 and 30 are provided extending through air gaps 31 and 32 in end or side leg portions 3' and 4' which form extensions on opposite ends of the core. The remainder of the core structure is the same as shown in the form of the invention disclosed in FIG. 1 and this core structure is also similar to that disclosed in my copending patent application Serial No. 275,585, filed April 25, 1963, now Patent No. 3,127,580 for "Current Regulating Welding Transformers and Core Therefor," which is incorporated herein by reference and a more detailed explanation of the advantages of the core structure per se. The movable shunt members 29 and 30 may be set even with the iron of the air gap or a small air gap may be provided between the shunts and the side leg portions, depending upon the particular requirements of the machine. The inductance or core saturation control winding transformer core in surrounding relation to the shuntings 9 and 10 are disposed in stationary relation with the transformer core in surrounding relation to the shunts 29 and 30 and the shunts are independently laterally adjustable to move in and out of the centers of these windings. The excitation circuit for the saturation control windings is the same as that shown in FIG. 1.

In this form of the invention primary winding 13 is wound about bottom transverse leg portion 2 between intermediate leg portions or core leg sections 5 and 6 and is connected across a suitable source of A.C. power in the usual manner. A condenser winding 33 is wound concentrically with primary winding 13' in inductive relation therewith and is provided with a series circuit, comprising a bank of capacitors 34 and the normally open contacts 35 of a solenoid 36, connected across the extremities of the winding.

The secondary circuit of the transformer, which comprises the welding circuit, includes a main secondary winding 14' concentrically wound with primary winding 13' and condenser winding 33 about bottom transverse leg portion 2, an auxiliary secondary winding 16' wound about top leg portion 1, and a third secondary winding 37 wound about the perimeter of the transformer between intermediate leg portions 5 and 6 and on top of the previously mentioned windings so as to be inductively coupled with each of these windings. One end of main secondary winding 14' is connected to the work 15 while its opposite end is connected to one end of third secondary winding 37, the opposite end of which is connected to auxiliary secondary winding 16' which in turn has its opposite end connected to the welding electrode 17 to complete the secondary welding circuit. The actuating coil of the solenoid switch 36 is connected across a few turns of third secondary windings 37 as shown so that the solenoid is arranged to place the capacitors 34 across winding 33 only when the secondary is under load, that is when the arc is struck and is arranged to cut the capacitors 34 out of the circuit when the transformer is idling. Secondary windings 14', 37 and 16' are shown connected in additive relation for maximum output current at the welding electrodes but it is to be understood that certain of the secondary windings, such as third secondary winding 37, can be connected in bucking relation with the other secondary windings to adjust the maximum current output of the machine.

In operation, the primary winding is energized from an A.C. source to establish the A.C. flux path 24 in the core as well as other flux paths through the outer legs of the core, and the saturation control windings 9 and 10 are energized by power from the D. C. battery source 11 to set up the D.C. flux paths 25', 26', 27', and 28' in the end extremities of the transformer core in the same manner as previously described in connection with the transformer of FIG. 1.

When the welding arc is struck this closes the secondary circuit to place the transformer under load and current flows through the secondary circuit, particularly through third secondary winding 37 which energizes solenoid 36 and places the bank of capacitors 34 across condenser winding 33 in offset performs as another primary their maximum value. As the capacitors charge condenser winding 33 is effect performs as another primary winding, increasing the lines of flux in the A.C. flux paths to thus increase the current in the secondary circuit since each of the additive connected secondary windings 14', 16', and 37 cut the A.C. flux paths.

The movable shunt members 29 and 30 lie in both the A.C. and D.C. flux paths and thus affect both of these paths when the same are adjusted. As described in copending application Serial No. 275,585, previously mentioned, one of the shunt members 29 or 30 is adjusted to a selected lateral position to set the maximum secondary output current which the machine is capable of delivering at that particular setting of the shunt. The oppositely disposed shunt 29 or 30 is then laterally adjusted to vary the output current from the set maximum down to a desired minimum value which the welder may require for a particular type of work. By manipulating the rheostat 12 a much finer adjustment of the welding current can then be obtained by the operator, since this adjustment is designed to increase or decrease the reluctance of the core by varying the saturation of the core by manipulation of the magnitude of the D.C. flux paths in the core established by the core saturation control windings 9 and 10. The highest secondary output current available at the welding electrode is obtained when both shunts are all the way out and the current is reduced as the shunts are moved inwardly toward the intermediate leg portions 5 and 6. The rheostat 12 serves as a fine adjustment for the welding current at any setting of the shunts; however, control of the output welding current by manipulation of rheostat 12 is increased as the shunts 29 and 30 are moved closer to the intermediate leg portions since this reduces the air gap in the D.C. flux paths 25'–28'. Manual manipulation of the shunt members 29 and 30 is believed to effect mainly the A.C. leakage flux paths in the core but the exact theory of operation is not known.

It is to be understood that the condenser charging windings 20 and 33 and/or the third secondary winding 37 wound about the perimeter of the transformer may be omitted from the circuit, if desired, depending upon the desires of the user, and the D.C. excited core saturation control windings will still have the desired effect of adjusting the output current to a desired magnitude. Saturation windings are required at both ends of the core in order to saturate the core.

Figure 3:
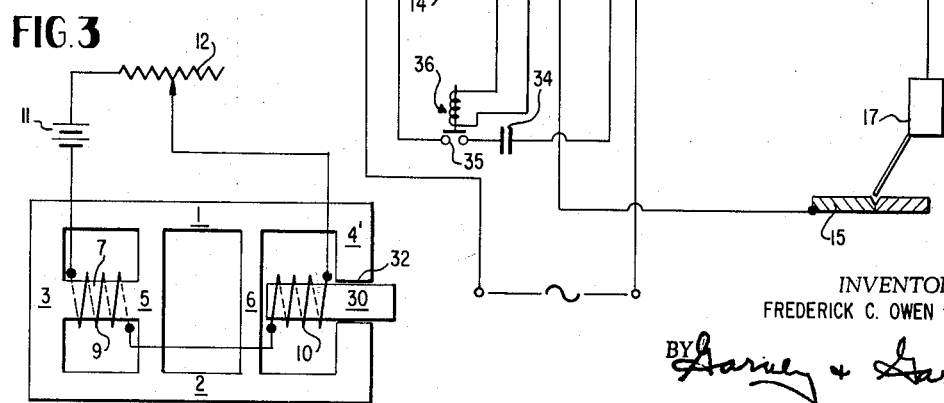
FIG. 3 is an electrical schematic diagram of a further modified form of the invention, with parts omitted, the figure showing a combination of the transformers of FIGS. 1 and 2.

A further modified form of the invention is schematically shown in FIG. 3 wherein the main transformer windings have been omitted for sake of clarity, but it is to be understood that the windings shown in FIGS. 1 or 2 can be used on the core structure shown. The core of this transformer is a combination of the transformer cores shown in FIGS. 1 and 2 with a stationary lateral leg portion or shunt core section bridging side or end leg portion 3 and intermediate leg portion or core leg section 5 at one end of the core and a laterally movable shunt core section or member 30 extending through an air gap 32 in side or end leg portion 4' at the opposite end of the core, with the shunt being movable in and out of the center of stationary core saturation control winding 10 toward and away from intermediate leg portion or core leg section 6. Core saturation control winding 9 is wound in surrounding relation about lateral leg portion or shunt core section 7 in the same manner as set forth in FIG. 1 with the inductance windings 9 and 10 connected in series circuit with battery 11 and rheostat 12 as in the previous forms of the invention. In this arrangement of the transformer when the welding arc is struck, shunt 30 is moved in or out of air gap 32 toward or away from leg portion 6 to decrease or increase the output current to a selected magnitude. Rheostat 12 is then adjusted to finely adjust the welding current to the desired magnitude by increasing or decreasing the reluctance in the core. Depending upon design requirements for the welding machine, a small air gap may be provided in side leg portion 3, above leg portion 7, or at the end of leg portion 7 adjacent intermediate leg portion 5.

The transformers of each form of the invention disclosed do not have to be shielded as the end extensions of the core shunt the A.C. leakage fluxes back into the core and it is believed that the movable shunt members 29 and 30 adjust these A.C. flux paths to vary the magnetic coupling between the primary and secondary windings to thus vary the secondary output current.

While idling, the transformers consume only approximately 1% or 2% of the current that they require at full load. While the invention has been described in certain preferred embodiments it is realized that modifications can be made and it is to be understood that no limitations upon the invention are intended other than those imposed by the scope of the appended claims.

What I claim as new and desire to secure by Letters Patent of the United States, is as follows:

1. A welding transformer comprising a generally rectangular core including end leg portions and transverse leg portions, a pair of core leg sections connecting opposite transverse leg portions of said core intermediate said end leg portions, shunt core sections extending between said end leg portions and said core leg sections and generally at right angles thereto in opposite ends of the core, inductively coupled primary and secondary windings adapted to produce a secondary output current positioned on said core intermiate said pair of core leg sections, and inductance windings disposed about said shunt core sections and adapted for connection to a D.C. power source to change the reluctance of the core at opposite ends for finely adjusting the secondary output current.

2. A welding transformer as set forth in claim 1 including a rheostat connected in series circuit with said inductance windings.

3. A welding transformer as set forth in claim 1 in which said shunt core sections are rigidly connected in stationary position between said end leg portions and said core leg sections.

4. A welding transformer as set forth in claim 1 including an air gap formed in one of said end leg portions at one end of the core, and in which said shunt core sections comprise a first shunt core section laterally movable in said air grap through the center of the associated inductance winding and toward and away from the adjacent core leg section to vary the secondary output current from a minimum to a maximum, and a second shunt core section rigidly connected in the opposite end of the core between the end leg portion and the adjacent core leg section.

5. A welding transformer as set forth in claim 1 including air gaps in said end leg portions at opposite ends of the core, and in which said shunt core sections comprise independently laterally movable shunt members movable in said air gap through the centers of said inductance windings toward and away from said core leg sections.

6. A welding transformer comprising a core having upper, lower and end leg portions, a pair of core leg sections connecting said upper and lower leg portions intermediate said end leg portions, shunt core sections extending between said end leg portions and said core leg sections in opposite ends of the core between said upper and lower leg portions, primary and secondary windings positioned on said upper and lower leg portions between said core leg sections and inductively coupled to produce a secondary output current, and inductance windings disposed about said shunt core sections and adapted for connection to a variable source of D.C. power for varying the reluctance of opposite ends of the core to vary the secondary output current.

7. A welding transformer comprising inductively coupled primary and secondary windings producing an output current, a closed ferromagnetic core composing the magnetic circuit for said windings, core extensions on opposite ends of said core outwardly of said windings, each of said core extensions having an air gap therein providing a pair of oppositely disposed air gaps, a shunt transversely movable in one of said air gaps to a preset position to set the maximum output current from said secondary winding, another shunt independently transversely movable in the other of said air gaps to selectively vary the output current from the set maximum to a minimum, and a pair of D.C. excited inductance windings disposed in surrounding relation to the plane of movement of said shunt members to vary the reluctance of said core and said core extensions for providing fine adjustment of the output current.

8. A welding transformer comprising a core with a pair of gaps at opposite points therein, a pair of shunt core sections positioned in said gaps and slidable therein for selectively bridging and opening said gaps independently, a pair of core leg sections connecting opposite portions of said core intermediate said air gaps and disposed in spaced relation and normal to the plane of movement of shunt core sections, primary and secondary windings producing and output welding current positioned on said core intermediate said spaced pair of core leg sections, one of said shunt core sections being movable toward and away from one of said core leg sections to selected positions to set the maximum permissible output current from said secondary, the other of said shunt core sections being movable toward and away from the other core leg section to vary the secondary output current from the set permissible maximum to a minimum, a D.C. power source, inductance windings connected to said D.C. power source and positioned between said core leg sections and said gaps and disposed in surrounding relation to the plane of movement of said shunt core sections and adapted to saturate the core to provide fine adjustment of the output current.

9. A welding transformer comprising a core having upper, lower and end leg portions, a pair of core leg sections connecting said upper and lower leg portions intermediate said end leg portions, lateral leg portions disposed generally parallel with and positioned between said upper and lower leg portions connecting said core leg sections and said end leg portions at opposite ends of the core, inductance windings disposed about said lateral leg portions adapted to be energized by a variable D.C. source to vary the D.C. saturation of said core, a primary winding disposed on said lower leg portion intermediate said core leg sections, a first secondary winding disposed on said lower leg portion intermediate said core leg sections, a second secondary winding disposed on said upper leg portion intermediate said core leg sections, said first and second leg portions connected to form an output welding circuit and inductively coupled to said primary winding and adapted to produce an A.C. output current variable with variations in D.C. energization of said inductance windings.

10. A welding transformer as set forth in claim 9 and a capacitor charging winding disposed about said primary and secondary windings intermediate said core leg sections, switch means having an actuator connected across a portion of said capacitor charging winding, capacitor means connected in series circuit with said switch means, said capacitor charging winding and a portion of said primary winding, and said capacitor charging winding adapted to energize said actuator to close said switch means and charge said capacitor means when said output welding circuit is put under load.

References Cited in the file of this patent

UNITED STATES PATENTS

| | | |
|---|---|---|
| 1,862,204 | Sorensen | June 7, 1932 |
| 2,216,631 | Sorensen | Oct. 1, 1940 |
| 2,434,214 | Haug | Feb. 3, 1948 |
| 2,500,189 | Landis | Mar. 14, 1950 |
| 2,765,119 | Marvin | Oct. 2, 1956 |

UNITED STATES PATENT OFFICE
CERTIFICATE OF CORRECTION

Patent No. 3,147,455 September 1, 1964

Frederick C. Owen

It is hereby certified that error appears in the above numbered patent requiring correction and that the said Letters Patent should read as corrected below.

Column 2, line 40, after "will" insert -- be --; column 4, line 10, for "and" read -- for --; line 17, strike out "transformer core in surrounding relation to the shunts"; column 5, line 2, for "in offset performs as another primary" read -- to cause the capacitors to charge to --; line 4, for "is" read -- in --; column 6, line 46, for "grap" read -- gap --; column 7, line 24, for "and" read -- an --.

Signed and sealed this 24th day of November 1964.

(SEAL)
Attest:

ERNEST W. SWIDER
Attesting Officer

EDWARD J. BRENNER
Commissioner of Patents